US009425589B2

(12) United States Patent
Hashimoto et al.

(10) Patent No.: US 9,425,589 B2
(45) Date of Patent: Aug. 23, 2016

(54) GAS-INSULATED SWITCHGEAR

(71) Applicant: Hitachi, Ltd., Chiyoda-ku, Tokyo (JP)

(72) Inventors: Hiroaki Hashimoto, Tokyo (JP);
Kenichi Okubo, Tokyo (JP); Daisuke Ebisawa, Tokyo (JP); Makoto Hirose, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/421,513

(22) PCT Filed: Jul. 19, 2013

(86) PCT No.: PCT/JP2013/069576
§ 371 (c)(1),
(2) Date: Feb. 13, 2015

(87) PCT Pub. No.: WO2014/045693
PCT Pub. Date: Mar. 27, 2014

(65) Prior Publication Data
US 2015/0236485 A1      Aug. 20, 2015

(30) Foreign Application Priority Data

Sep. 18, 2012  (JP) ................................. 2012-203841

(51) Int. Cl.
*H02B 5/06* (2006.01)
*H01H 33/42* (2006.01)
*H01H 33/56* (2006.01)

(52) U.S. Cl.
CPC ................. *H02B 5/06* (2013.01); *H01H 33/42* (2013.01); *H01H 33/56* (2013.01)

(58) Field of Classification Search
CPC ........ H02B 5/06; H02B 3/00; H02B 13/0352; H01H 33/42; H01H 33/58; H01H 33/30; H01H 33/40; H01H 33/50; H01H 33/565; H01H 33/91

USPC ................. 361/600–605, 611–624, 632–648; 218/7, 10, 52, 62, 64, 79, 80, 90, 14, 218/78, 84, 118, 154, 134, 143, 120, 103, 218/106, 152, 153; 200/48 R, 17 R, 50.17, 200/82 B, 308, 400, 401, 500, 501, 318, 200/320, 293; 174/70 B, 73.1
See application file for complete search history.

(56) References Cited

U.S. PATENT DOCUMENTS 4,027,125 A * 5/1977 Peek ......................... H01H 3/30
                                                        200/308
4,514,783 A * 4/1985 Olsen ....................... H02B 3/00
                                                        200/50.17

(Continued)

FOREIGN PATENT DOCUMENTS

JP        52-71650 A      6/1977
JP        63-146405 U     9/1988

(Continued)

OTHER PUBLICATIONS

Japanese Office Action issued in counterpart Japanese Application No. 2014-536645 dated Sep. 8, 2015 with English-language translation (six (6) pages).

(Continued)

*Primary Examiner* — Michail V Datskovskiy
(74) *Attorney, Agent, or Firm* — Crowell & Moring LLP

(57) ABSTRACT

A circuit breaker (33) formed with a sealed tank (4) having a breaker section and an operating mechanism (2) is laterally arranged in a lengthwise direction and is fixed to a frame (1), and above the circuit breaker, main bus containers (11, 12) are provided, substantially orthogonally to an axial direction of the circuit breaker (33). Operating mechanism-side working space (B) and breaker section-side working space (C) are provided respectively above the operating mechanism (2) and the sealed tank (4), and a hand hole (5) is provided on an upper surface of the sealed tank (4). A connecting pin (24) is provided in a link mechanism connecting the operating mechanism (2) and the movable contact (7), and an operating mechanism-side working hole for accessibility to the connecting pin (24) from the operating mechanism-side working space (B) is provided.

4 Claims, 4 Drawing Sheets

(56) References Cited

U.S. PATENT DOCUMENTS

| | | | | |
|---|---|---|---|---|
| 4,713,508 | A * | 12/1987 | Baginski | H01H 3/30 185/45 |
| 5,932,858 | A * | 8/1999 | Meinherz | H01H 33/40 218/154 |
| 6,407,908 | B1 * | 6/2002 | Iryo | H01H 33/42 200/82 B |
| 6,614,648 | B2 * | 9/2003 | Yamane | H02B 5/06 174/17 SF |
| 6,617,088 | B2 * | 9/2003 | Iizuka | G03G 9/0819 430/110.4 |
| 6,672,387 | B2 * | 1/2004 | Brady | E21B 43/385 166/105.5 |
| 7,528,336 | B2 * | 5/2009 | Hashimoto | H01H 33/40 200/400 |
| 7,675,738 | B2 * | 3/2010 | Fukunaga | H02B 13/0352 218/10 |
| 7,880,105 | B2 * | 2/2011 | Hashimoto | H01H 3/30 200/17 R |
| 2003/0117769 | A1 | 6/2003 | Yamane et al. | |
| 2004/0037025 | A1 | 2/2004 | Abe | |

FOREIGN PATENT DOCUMENTS

| | | |
|---|---|---|
| JP | 5-95609 A | 4/1993 |
| JP | 10-80020 A | 3/1998 |
| JP | 2003-199220 A | 7/2003 |
| JP | 2003-229038 A | 8/2003 |
| JP | 2004-72888 A | 3/2004 |
| JP | 2011-29004 A | 2/2011 |

OTHER PUBLICATIONS

International Search Report (PCT/ISA/210) dated Oct. 8, 2013 with English translation (six pages).

* cited by examiner

GAS-INSULATED SWITCHGEAR

TECHNICAL FIELD

The present invention relates to a gas-insulated switchgear having a gas circuit breaker, a disconnector, an earthing device, a bus and the like.

BACKGROUND ART

A gas-insulated switchgear having a bus container is provided between a three-phase high voltage power supply and an air power transmission line in a transformer substation or the like, to detect an abnormal current such as lightning surge and break the current. It has a bushing to receive electricity transmitted from the three-phase high voltage power supply, a bus container containing a three-phase bus conductor which is gas-insulated to supply electricity from the bushing to the gas circuit breaker, a disconnector, an earthing device and the like. In recent years, to reduce the installation area for the gas-insulated switchgear and to reduce transportation cost, downsizing of the respective devices such as the gas circuit breaker is required.

An invention of a double-bus gas-insulated switchgear with the purpose of downsizing in a height direction is described in patent document 1. This invention is configured as follows. A line-side device is connected to an upper terminal of a vertically-arranged circuit breaker, and a branch bus branching in a downward direction and a horizontal direction is connected to a lower terminal of the circuit breaker. A first bus-side disconnector is laterally arranged on the downward directional branch of the branch bus, and a second bus-side disconnector is laterally arranged on the horizontal directional branch of the branch bus. A first main bus is connected in the horizontal direction of the first bus-side disconnector, and the first main bus is connected in the downward direction of the second bus-side disconnector.

Further, an invention of a gas-insulated switchgear with the purpose of suppressing the height directional size and the installation area and reducing transportation cost is described in patent document 2. This invention is configured such that at least a bus disconnector and a main bus are provided at one side of a circuit breaker as a central device, and at least a line earthing switch, an arrester, a current transformer, and a cable head are provided at the other side.

CITATION LIST

Patent Document

Patent document 1: Japanese Patent Application Laid-Open No. Hei 5-95609
Patent document 2: Japanese Patent Application Laid-Open No. Hei 10-80020

SUMMARY OF THE INVENTION

Problem to be Solved by the Invention

However, in the configuration of the patent document 1, as the circuit breaker is vertically arranged, it is not possible to suppress the entire height of the gas-insulated switchgear to or shorter than the height of the circuit breaker. Further, as an operating mechanism is provided immediately below the circuit breaker, upon maintenance of the circuit breaker and the operating mechanism, it is necessary to remove these devices from the gas-insulated switchgear. At this time, in some cases, heavy equipment is brought in the small installation space to perform work, and there is a problem in working property.

In the configuration disclosed in the patent document 2, different from the configuration in the patent document 1, the operating mechanism is provided on one side of the breaker section. However, the breaker section itself is vertically arranged, and a shock absorber to absorb the spring force of the operating mechanism is provided immediately below the breaker section, accordingly, the reduction of the gas-insulated switchgear in the height direction is limited. Further, as the breaker section is positioned at the center of the gas-insulated switchgear, it is not possible to perform maintenance of the breaker section with facility.

Further, in the configuration in the patent document 2, as the main bus is doubly provided above the operating mechanism, when the operating mechanism is removed using heavy equipment upon inspection or the like, it is necessary to discreetly perform the operation in consideration of the bus, and the working property is poor.

In this manner, when the gas-insulated switchgear is downsized, the problem of maintenance working property occurs in many cases. Accordingly; the present invention has an object to provide a gas-insulated switchgear in which the downsizing of the gas-insulated switchgear and improvement in the maintenance working property are achieved. More particularly, it has an object to reduce transportation cost, improve efficiency of on-site installation work, and improve the maintenance working property of the gas circuit breaker, by suppression of the entire height of the gas-insulated switchgear.

Mean for Solving the Problem

The gas insulated switchgear according to the present invention is a gas-insulated switchgear, in which a circuit breaker, having a fixed contact, a movable contact brought into contact and away with respect to the fixed contact, a sealed tank including the fixed contact and the movable contact inside and filled with insulating gas, an operating mechanism using an elastic body as a driving source to drive the movable contact, and a link mechanism connecting the operating mechanism and the movable contact, is laterally arranged in a longitudinal direction and is fixed to a frame. A current transformer is connected to a conductor pullout part of the movable contact in the sealed tank, and a connection conductor is connected to an upper part of the current transformer. Further, a main bus is connected, approximately orthogonally to an axial direction of the circuit breaker via a disconnector, to both ends of the connecting conductor. Further, one end of another current transformer is connected to the conductor pullout part of the fixed contact in the sealed tank. Further, other end of the current transformer is connected to a power-transmission line via the disconnector. Further, breaker section-side working space and operating mechanism-side working space are provided respectively above the sealed tank and the operating mechanism, with a current transformer provided in the conductor pullout part of the movable contact therebetween. Further, a breaker section-side working hole is provided in an upper surface of the sealed tank.

The height and width of the "breaker section-side working space" and the "operating mechanism-side working space" respectively provided above the sealed tank and the operating mechanism are sufficient as long as an operator can creep into the space to perform the maintenance work, and the main bus provided in the upper position is not an obstacle upon maintenance work in the space.

As the "breaker section-side working hole" provided in an upper surface of the sealed tank, any hole may be used as long as it has a sufficient size to perform inspection of the breaker section mainly having a fixed contact, a movable contact, a buffer cylinder and the like, and the shape is not particularly limited.

"The main bus is provided substantially orthogonally with respect to an axial direction of the circuit breaker" means that as long as the main bus is in a direction substantially orthogonal to the axial direction of the circuit breaker, whether or not it is exactly orthogonal to the axial direction is not checked. It intersects, with reference to 90 degrees, with a shift of several degrees. The main bus extends in substantially parallel to the ground, and is provided above the three-phase circuit breaker.

The "link mechanism" has, e.g., a link and a lever, to convert the direction of a driving force of the operating mechanism transmitted to the link with the lever and transmit the force.

Advantageous Effects of the Invention

According to the present invention, it is possible to suppress the entire height of the gas-insulated switchgear by laterally arranging the gas circuit breaker. With this arrangement, since it is possible to accommodate the entire gas-insulated switchgear in a delivery container without disassembling the gas-insulated switchgear and to transport it, it is possible to reduce the transportation cost and improve the working property upon on-site installation.

Further, it is possible to improve the maintenance working property by providing working space to remove the operating mechanism from the gas circuit breaker in the space surrounded by the operating mechanism, the current transformer, the disconnector and the main bus, while by providing working space to inspect the inside of the sealed tank in the space surrounded by the sealed tank, the current transformer, the disconnector, and the main bus.

BRIEF DESCRIPTION OF DRAWINGS

FIG. 2 is a side view showing a status in which in the gas-insulated switchgear according to Embodiment 1, a spring operating mechanism is removed upon maintenance.

FIG. 4 is a side view showing an enlarged part of the gas circuit breaker in the gas-insulated switchgear according to Embodiment 1.

DESCRIPTION OF EMBODIMENTS

Hereinbelow, an embodiment preferable for implementation of the present invention will be described using the drawings. Note that the following description is merely an example and not intended to limit the contents of the invention to the following particular aspect. Various modifications and changes can be made to the preferred embodiment of the invention within the scope of the claims.

Embodiment 1

Figure 1:
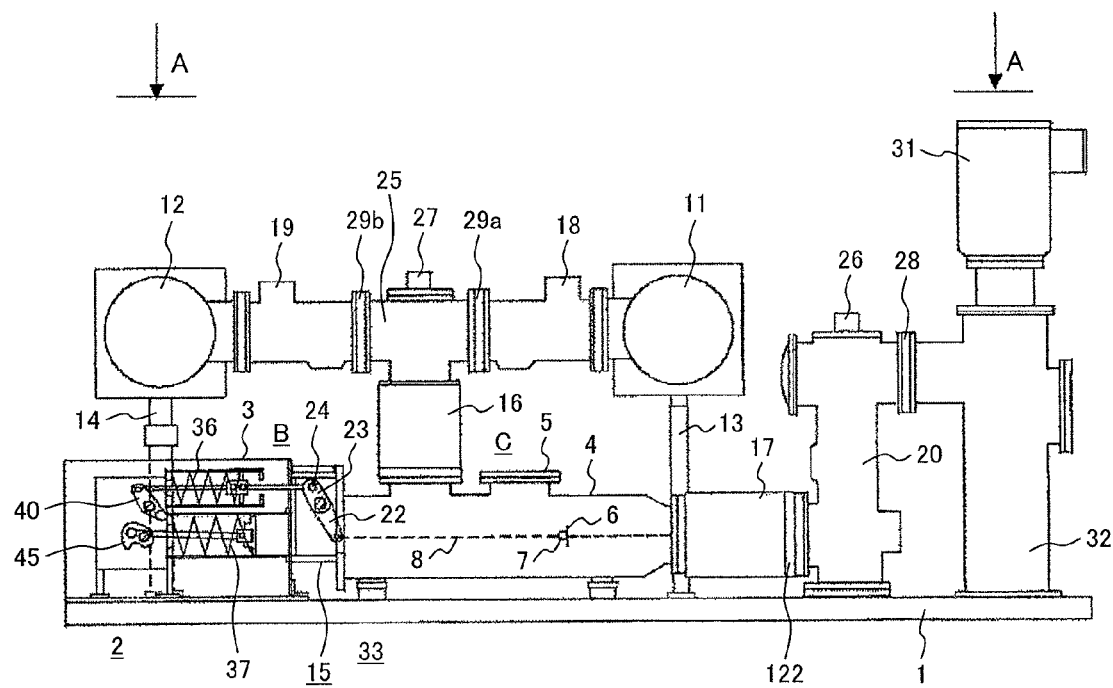
FIG. 1 is a side view of a gas-insulated switchgear according to Embodiment 1. The part of an operating mechanism is a cross-sectional diagram, in which a fixed contact and a movable contact of a gas circuit breaker are indicated with a dotted line. Hereinafter.

Embodiment 1 will be described using FIG. 1 to FIG. 4. FIG. 1 is an example of the configuration of gas-insulated switchgear according to the present invention. In the gas-insulated switchgear shown in FIG. 1, a horizontally-arranged gas circuit breaker 33, an instrument current transformer 16 and a bus connecting conductor 25 are connected to an upper part of the gas circuit breaker. An earthing device 27 is connected via a flange to an upper part of the bus connecting conductor 25.

Main bus disconnectors 18 and 19 are provided on both sides of insulating spacers 29a and 29b provided at both ends of the bus connecting conductor 25. Main bus containers 11 and 12, extending in a substantially orthogonal direction to an axial direction of the gas circuit breaker 33, are provided in the respective disconnectors 18 and 19.

Operating mechanism-side working space B is provided in space surrounded by the main bus container 12, the disconnector 19, the current transformer 16 and the operating mechanism 2. Breaker section-side working space C is provided in space surrounded by the main bus container 11, the disconnector 18, the current transformer 16 and the sealed tank 4.

These spaces are sufficient as long as they have height and width for an operator to creep in and perform maintenance work. In the breaker section-side working space C, it is possible to perform maintenance on the breaker section from a hand hole 5. In the operating mechanism-side working space B, as described later, it is possible to remove the operating mechanism 2 from the circuit breaker, and further, it is possible to remove only an operation box 3. As described later, it is possible to access a control mechanism for the operating mechanism to perform inspection or the like by removing the operation box 3.

The main bus containers 11 and 12 are provided with removable poles 13 and 14 on a common frame 1. When the gas circuit breaker 33 is removed upon accident or inspection, it is possible to perform work without removing the main bus containers 11 and 12 and the disconnectors 18 and 19.

An instrument current transformer 17 is connected via a flange to the right side of the drawing sheet of the gas circuit breaker 33. The instrument current transformer 17 is provided with a vertically-arranged line-side disconnector 20 via an insulating spacer 122. The line-side disconnector 20 is provided with an earthing device 26. An instrument transformer 31 and an underground cable head 32 are connected via the insulating spacer 28 to the right side of the drawing sheet of the disconnector 20.

Figure 3:
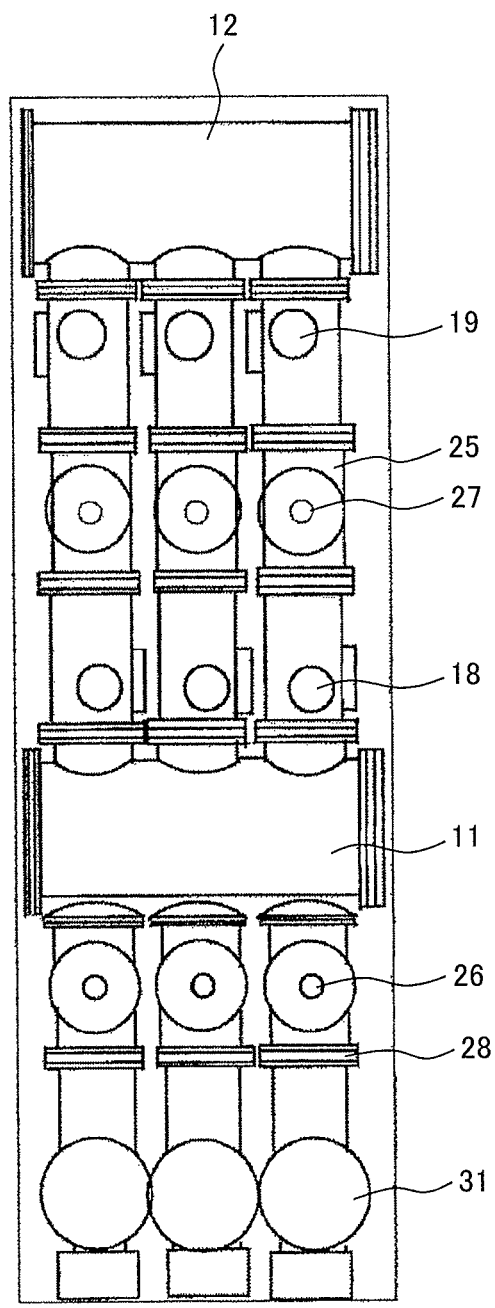
FIG. 3 is a plan view of the gas-insulated switchgear according to Embodiment 1.

FIG. 3 shows the configuration of the gas-insulated switchgear from a viewpoint in an upper position, viewed from an arrow A-A in FIG. 1. The main bus containers 11 and 12 contain three-phase buses. In each phase, the instrument current transformer 16 shown in FIG. 1 is provided substantially below the bus connecting conductor 25 connecting the disconnectors 18 and 19 shown in FIG. 3.

The disconnector 20 explicitly shown in FIG. 1 is connected to a lower part of the earthing device 26 shown in FIG. 3. The earthing device 26 is connected through the insulating spacer 28 to the instrument transformer 31. The underground cable head (32 in FIG. 1) connected to a power-transmission line (not shown) is provided in a lower part of the instrument transformer 31.

Next, the details of the gas circuit breaker 33 will be described based on FIG. 4. The gas circuit breaker 33 schematically has the sealed tank 4 accommodating the breaker section, a spring operating mechanism 2, and a mechanical section 15 connecting the spring operating mechanism 2 and the sealed tank 4. The sealed tank 4 is connected to the common frame 1 with legs 10a and 10b, and the inside of the tank is filled with insulating gas e.g. $SF_6$ at prescribed pressure.

The hand hole 5 provided for maintenance of the breaker section is provided on the upper surface of the sealed tank 4. As shown in FIG. 1, the breaker section-side working space C is provided above the hand hole 5. When the insulating gas in the sealed tank 4 is collected, it is possible to perform maintenance of the breaker section with facility by releasing the hand hole 5.

In the sealed tank 4, electricity is passed through a breaker section contact point having a movable contact 7 and a fixed contact 6 via an unshown conductor. An insulative link 8 is connected to the movable contact 7 on the opposite side to the side in contact with the fixed contact 6. The breaker section contact point is opened/closed by action of the driving force from the spring operating mechanism 2 via the mechanical section 15 to the insulative link 8.

The mechanical section 15 is connected to the flange of the sealed tank 4 on the extended end side of the insulative link 8. A shaft 21, a gas lever 22 and an air lever 23 fixed to the shaft 21 are provided in the mechanical section 15.

The mechanical section 15 is provided with unshown gas seal chamber and atmosphere chamber communicating with the sealed tank 4. The shaft 21 is passed through the both chambers and is supported, and unshown gas seal mechanism is provided. The gas lever 22 is connected to the gas seal chamber side of the shaft 21, and the air lever 23 is connected to the atmosphere chamber side.

The insulative link 8 is connected to one end of the gas lever. An output link 30 from the spring operating mechanism 2 is rotatably connected to one end of the air lever 23 with a connecting pin 24. A removable cover 15a is provided on the upper surface of the mechanical section 15. It is possible to access the connecting pin 24 connecting the air lever 23 and the link 30 with facility from an operating mechanism-side working hole made by removing the cover 15a. As the details will be described later, it is possible by removing the connecting pin 24 to remove the spring operating mechanism 2 from the mechanical section 15 with facility.

Note that the air lever 22 and the gas lever 23 are not always provided in the mechanical section 15 but may be provided inside the sealed tank 4. Further, in the above-described configuration, the gas seal chamber and the atmosphere chamber are separated with the shaft 21, however, the separation is not limited to the shaft 21 but may be separated with a direct acting part such as the output link 30.

Next, the configuration of the spring operating mechanism 2 will be described. The spring operating mechanism 2 is fixed to the mechanical section 15 and the common frame 1 with a fixing plate 10c. The legs 10d and 10e are also fixed to the common frame 1. Among these elements, the leg 10e may be removable from a housing 9.

In the spring operating mechanism 2, a cylindrical opening spring case 34 and a closing spring case 35 are fixed with their respective one end to the housing 9 in the operation box 3. The other end of the closing spring case 35 is fixed to the fixing plate 10c. Respective opening spring 36 and a closing spring 37 are accommodated in the two spring cases.

One end of the opening spring 36 is supported with the housing 9, and the other end is supported with an opening spring bearing 38. One end of an opening spring link 39 is connected to one end of the opening spring bearing 38. The other end of the opening spring link 39 is connected to one end of a main lever 40. The main lever 40 is fixed to a shaft 41 the intermediate part of which is rotatably supported with the housing 9.

One end of the closing spring 37 of the spring operating mechanism 2 is supported with the housing 9, and the other end is supported with a closing spring bearing 42. One end of a closing spring link 43 is connected to the closing spring bearing 42. A closing cam 45 is rotatably connected to the other end of the closing spring link 43. The closing cam 45 is fixed to a shaft 44 rotatably supported with the housing 9.

A control mechanism (not shown) to hold or release the driving force of the closing spring and the opening spring is provided on the left side of the drawing sheet (hereinafter, the front side of the gas-insulated switchgear) in the housing 9 forming the spring operating mechanism 2.

As the control mechanism is positioned on the front side of the gas-insulated switchgear, upon inspection of the control mechanism, it is possible to perform inspection on the control mechanism without removing the spring operating mechanism from the gas-insulated switchgear. That is, it is possible to access the control mechanism from the front side of the gas-insulated switchgear and perform inspection or the like by entering the operating mechanism-side working space, removing bolts or the like fixing the operation box 3 and the mechanical section 15, and removing only the operation box 3.

Next, a procedure of attaching/removing the spring operating mechanism 2 for internal inspection of the gas circuit breaker 33 will be described. First, electricity-passed status of the circuit breaker is stopped, to bring the opening spring and the closing spring into discharging state, and taking the earth of the gas-insulated switchgear with the earthing device 27 (see FIG. 1) so as to avoid risk of reception of electrical shock.

As described above, the operating mechanism-side working space B in which at least a person can creep in is provided in the upper space of the operation box 3, and it is possible to remove the cover 15a of the mechanical section 15 from the space, to remove the connecting pin 24 (see FIG. 2 and FIG. 4) connecting the output link 30 and the air lever 23 from the working hole.

When the connecting pin 24 has been removed, the operation box 3 covering the outside of the operating mechanism is removed. The fixing plate 10c, the legs 10d and 10e are removed from the common frame 1, and a roller conveyer 47 is connected to the housing 9 (see FIG. 2). The position in which the roller conveyer 47 is connected to the housing 9 may be the leg 10e or may be other position. Further, it is preferable that a clearance in which an unloading machine such as a lifter is placed is provided between the housing 9 and the common frame 1.

Figure 2:
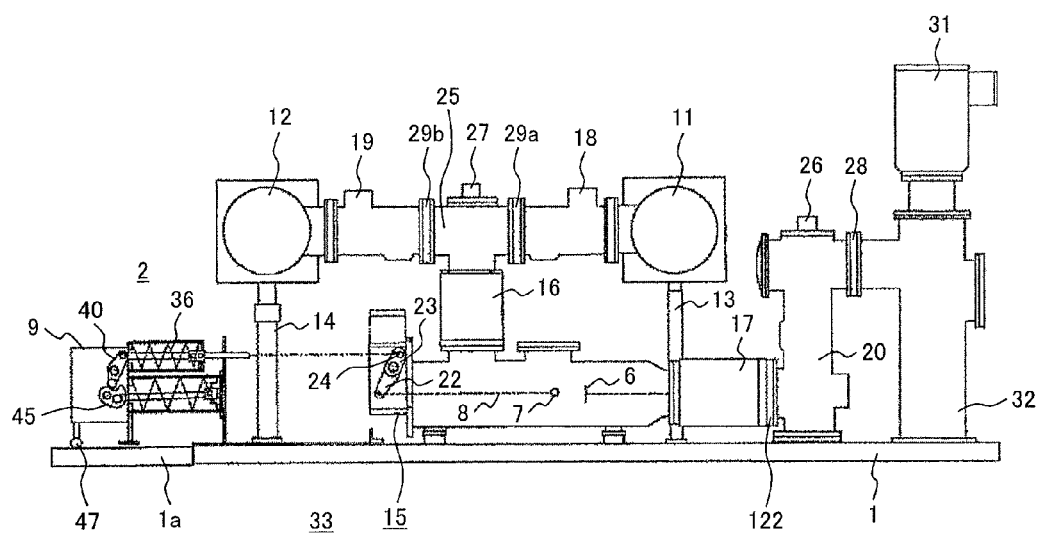
FIG. 2 and FIG. 4 are similar to FIG. 1.

As shown in FIG. 2, an auxiliary plate 1a is placed adjacently to the common frame 1, then the spring operating mechanism 2 in a status where the operation box 3 is removed is moved with a simplified conveyance machine such as a lifter in the leftward direction of the drawing sheet. The removal of the spring operating mechanism with heavy equipment such as a crane requires working time, however, it is possible to perform working without special heavy equipment by using the roller conveyer 47 and the auxiliary plate 1a, and it is possible to improve working property upon removal of the spring operating mechanism.

Even when some abnormality has occurred in the spring operating mechanism 2 and detailed inspection is to be performed, the spring operating mechanism 2 is removed in accordance with the above-described procedure and is collected, and another spring operating mechanism is attached, so as to let the gas circuit breaker recover quickly. Note that when the spring operating mechanism 2 is attached to the gas circuit breaker 33, the above-described procedure is performed reversely.

As described above, it is possible to suppress the entire height of the gas-insulated switchgear by laterally arranging the sealed tank and the spring operating mechanism of the gas circuit breaker. With this arrangement, as the entire gas-insulated switchgear is accommodated and transported in a delivery container (e.g., ISO standard 40 feet container) without disassembling the gas-insulated switchgear, it is possible to reduce transportation cost, and reduce working time of on-site installation.

Note that since low center of mass is realized in the gas-insulated switchgear with this arrangement, it is possible to improve seismic resistance.

Further, by providing a removable connecting member in the link mechanism connecting the movable contact 7 and the output link 30 of the spring operating mechanism 2 and by providing an operating mechanism-side working hole for accessibility to the removable connecting member from the operating mechanism-side working space B, it is possible to access the connecting member of the link mechanism from the operating mechanism-side working space B. Accordingly, it is possible to reduce working time to attach/remove the spring operating mechanism to/from the gas circuit breaker.

Note that the "removable connecting member" of the link mechanism is a member connected with an easily-removable part such as a connecting pin connecting a link and a lever. Further, the "working hole provided accessibly to the connecting member" may be any hole as long as its size is sufficient enough to perform the removal of the connecting member, and its shape is not particularly limited.

Figure 4:
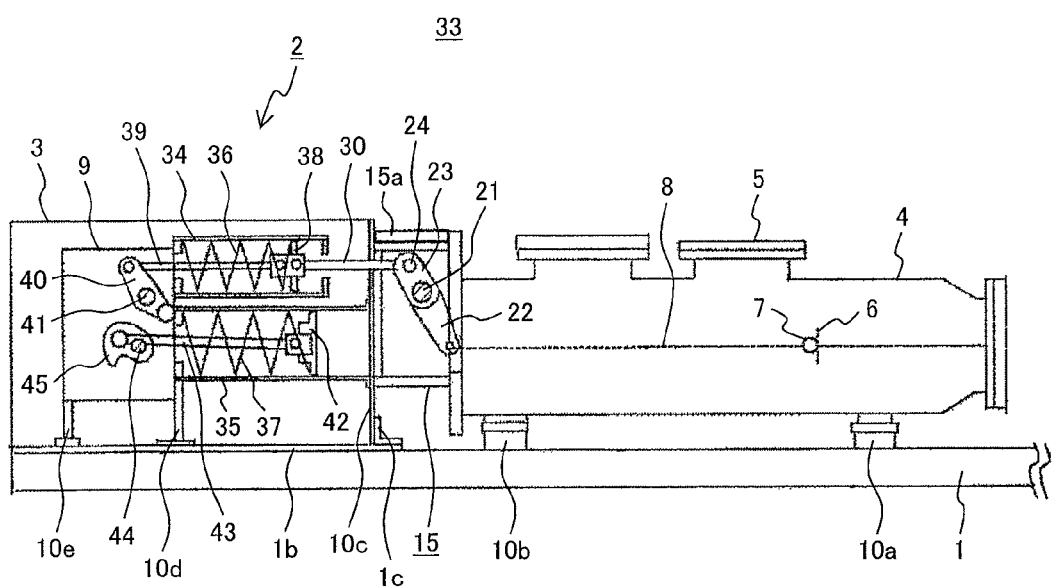

Further, as shown in FIG. 4, in the operating mechanism 2 having the opening spring 36 as a driving source to drive the movable contact 7, the control mechanism (not shown) to hold and release the opening spring 36, and the output link 30 to transmit the driving force of the opening spring 36 to the movable contact 7, by laterally arranging the opening spring 36 in the axial direction between the control mechanism and the output link 30, and by providing the control mechanism on the front side of the gas-insulated switchgear, it is possible to access the control mechanism with facility by removing the operation box 3. Accordingly, it is possible to improve the maintainability of the operating mechanism.

Further, by providing the roller conveyer in the spring operating mechanism, it is not necessary to lift the operating mechanism using particular heavy equipment or the like when the operating mechanism is removed from the gas circuit breaker, and it is possible to improve the working property.

Note that the insulating gas filled in the gas-insulated switchgear shown in the present embodiment is not limited to $SF_6$, but alternative $SF_6$ gases such as a gas mixture of $SF_6$, $N_2$ and $CF_4$, and a $CO_2$ gas may be used.

Further, in the spring operating mechanism of the gas circuit breaker shown in the present embodiment, compression coil springs are used as the opening spring and the closing spring. The spring is not limited to the compression coil spring. It is possible to perform exchange as long as it is a direct-acting elastic body element such as a conical spring. Further, it is possible to attain similar advantageous effects to those in the present embodiment when a compression coil spring is used as a main driving source and a torsion bar spring is applied to a secondary driving source.

REFERENCE SIGNS LIST

1 . . . common frame
2 . . . spring operating mechanism
3 . . . operation box
4 . . . sealed tank
5 . . . hand hole
6 . . . fixed contact
7 . . . movable contact
8 . . . insulative link
9 . . . housing
11 . . . main bus container
12 . . . main bus container
15 . . . mechanical section
16, 17 . . . instrument current transformer
18, 19, 20 . . . disconnector
24 . . . connecting pin
25 . . . bus connecting conductor
30 . . . output link
33 . . . gas circuit breaker
36 . . . opening spring
37 . . . closing spring
40 . . . main lever
45 . . . closing cam
47 . . . roller conveyer
B . . . operating mechanism-side working space
C . . . breaker section-side working space

The invention claimed is:

1. A gas-insulated switchgear which includes a circuit breaker laterally arranged in a longitudinal direction and fixed to a frame, comprising:
   a fixed contact;
   a movable contact brought into contact and away with respect to the fixed contact;
   a sealed tank including the fixed contact and the movable contact inside and filled with insulating gas;
   an operating mechanism using an elastic body as a driving source to drive the movable contact; and
   a mechanical section connecting the operating mechanism and the movable contact, wherein a current transformer is connected to a conductor pullout part of the movable contact in the sealed tank,
   a connecting conductor is connected to an upper part of the current transformer,
   a main bus is connected, substantially orthogonally to an axial direction of the circuit breaker via a disconnector, to both ends of the connecting conductor,
   one end of another current transformer is connected to the conductor pullout part of the fixed contact in the sealed tank,
   the other end of the current transformer is connected to a power-transmission line via a disconnector,
   breaker section-side working space and operating mechanism-side working space are provided respectively above the sealed tank and the operating mechanism, with a current transformer provided in the conductor pullout part of the movable contact therebetween, and
   a breaker section-side working hole is provided in an upper surface of the sealed tank,
   wherein a removable connecting member is provided in the mechanical section, and
   an operating mechanism-side working hole is provided, accessibly to the connecting member from the operating mechanism-side working space.

2. The gas-insulated switchgear according to claim 1, wherein the operating mechanism has an elastic body as a driving source to drive the movable contact and an output link to transmit the driving force of the elastic body to the movable contact, and
   the elastic body is laterally arranged in the axial direction between the control mechanism and the output link.

3. The gas-insulated switchgear according to claim 1, wherein the operating mechanism is provided with a roller.

4. The gas-insulated switchgear according to claim 2, wherein the operating mechanism is provided with a roller.

\* \* \* \* \*